United States Patent [19]

Turner

[11] 4,098,989

[45] Jul. 4, 1978

[54] POLYCHLOROPRENE POWDERS

[75] Inventor: Nathan L. Turner, Houston, Tex.

[73] Assignee: Denka Chemical Corporation, Houston, Tex.

[21] Appl. No.: 798,896

[22] Filed: May 20, 1977

Related U.S. Application Data

[63] Continuation-in-part of Ser. No. 711,768, Aug. 4, 1976, abandoned, which is a continuation-in-part of Ser. No. 571,957, Apr. 28, 1975, Pat. No. 3,988,306.

[51] Int. Cl.$^2$ .............................................. C08F 6/22
[52] U.S. Cl. ................... 528/486; 260/42.47; 528/487
[58] Field of Search .............................. 528/486, 487

[56] References Cited

U.S. PATENT DOCUMENTS

| | | | |
|---|---|---|---|
| 2,671,075 | 3/1954 | Hempel | 260/88.3 |
| 3,392,134 | 7/1968 | Apotheker | 260/29.7 |
| 3,558,576 | 1/1976 | Weller | 260/85.1 |
| 3,761,455 | 9/1973 | Tanara et al. | 260/85.1 |

*Primary Examiner*—Stanford M. Levin
*Attorney, Agent, or Firm*—Kenneth H. Johnson

[57] ABSTRACT

An improvement in the process of producing free-flowing polychloroprene powder wherein the spent coagulant solution is removed prior to adjusting the pH of the coagulated latex with a base, thereby reducing the amount of base required and wherein it has been found that an emulsifer which is stable in solutions, having a pH of less than 4.5, such as an alkali or alkaline earth of the condensate of formaldehyde and naphthalene sulfonic acid, added to the latex before or after the coagulant solution is mixed therewith, prevents agglomeration of the coagulated latex when the base solution is added.

13 Claims, 2 Drawing Figures

POLYCHLOROPRENE POWDERS

This application is a continuation-in-part of Ser. No. 711,768, now abandoned, filed Aug. 4, 1976, which was a continuation-in-part of Ser. No. 571,957, filed April 28, 1975, now U.S. Pat. No. 3,988,306, issued Oct. 26, 1976.

BACKGROUND OF THE INVENTION

This invention relates to the preparation of particulate polychloroprene. More particularly, the invention is a process for producing polychloroprene powders.

The polychloroprene powder can be used in substantially the same manner as prior crumb, and in addition, may be used in continuous automated processing. The powder has certain other advantages, however, since it requires less storage space because of the close packing of the particles. The powder is also free flowing, which makes it easier to transfer from the storage drums or sacks than the prior irregular crumb. The powder may also be employed in conventional molding techniques, used is dispersed form in suitable liquid carriers to apply coatings by roller coating, spray coating, and dip coating to a variety of substrates such as glass, ceramics, metal, wood, cloth, paper, paperboard and the like.

An earlier application, Ser. No. 571,957, filed Apr. 28, 1975, now U.S. Pat. No. 3,988,306, disclosed a process for producing particulate polychloroprene, especially powders comprising preparing a polychloroprene latex using a resin-type soap system, acidifying said latex, adding a minor amount of an alkyl sulfate salt to said latex, intimately mixing said latex with a coagulant solution, preferably adjusting the pH of the mixture of latex (slurry of rubber particles) and coagulant solution above 7, maintaining said mixture in a highly agitated state, recovering particulate polychloroprene and drying said particles. The alkyl sulfate was added to the latex after the polymerization reaction had been completed. The particular effectiveness of alkyl sulfate in substantially eliminating the agglomeration of the latex during coagulation is surprising.

In the process as described in the prior application, rather large amounts of base were required to reduce the acidity of the latex emulsion after the coagulation. Theoretically, any base could be used; however, since such large quantities of base were required, NaOH was effectively excluded because of the detrimental effect of the rubber of such massive amounts of Na ion. $NH_4OH$ was the base of practical choice. Quite obviously, the amount of base required for pH adjustment would be reduced if the coagulation solution were removed from the latex and the latex suspended and/or washed in a fresh solution, such as demineralized water. However, decantation of the coagulant solution followed either by the addition of base or the addition of demineralized water and subsequent addition of base resulted in massive agglomeration.

SUMMARY OF THE INVENTION

Briefly stated, it has been discovered in the process of producing particulate polychloroprene that the addition of emulsifiers, which are stable in solutions having a pH of less than 4.5, to either the latex emulsion after polymerzation and before coagulation or to the slurry after coagulation, stabilized the system so that the coagulant solution can be removed and water and/or base can be added to the slurry for washing the pH adjustment without agglomeration.

The amount of additional emulsifier employed is 0.5 to 5.0 parts per 100 parts of rubber (latex), preferably 1.0 to 3.0 phr. The emulsifiers which may be used according to the present invention include those known in the prior art and used, for example, in emulsion polymerizations. A number of these are described below. Particularly preferred additional emulsifiers for use in the present invention are the alkali or alkaline earth salts of the condensation product of formaldehyde and naphthalene sulfonic acid. The additional emulsifier is added to the latex after the polymerization is completed.

DETAILED DESCRIPTION OF THE INVENTION

Figure 1:
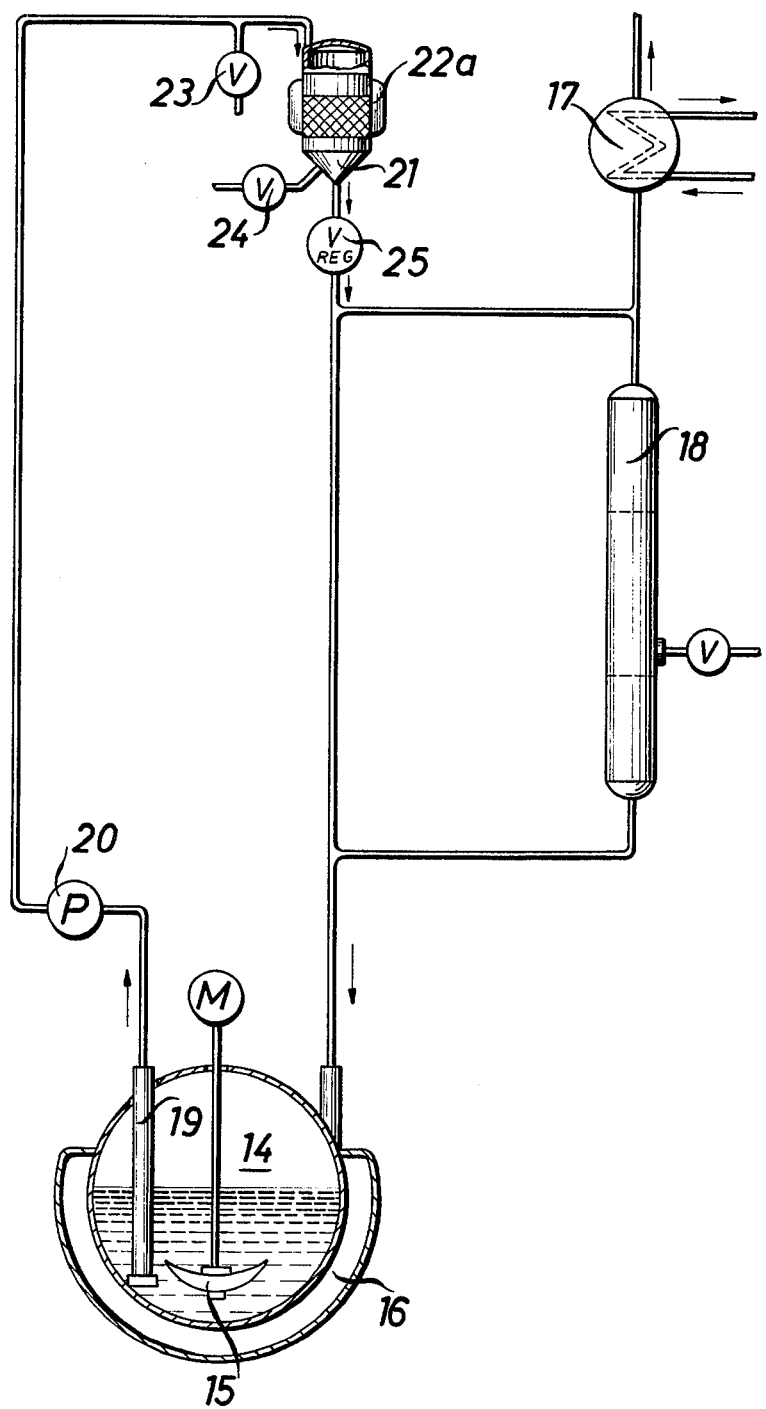

In particular, the present invention is in a process for producing particulate polychloroprene comprising preparing a polychloroprene latex using a resin or rosin soap emulsification system, acidifying said latex to a pH in the range of 5.5 to 6.3, dissolving in said latex 1 to 10 parts by weight of an alkyl sulfate salt having 6 to 20 carbon atoms, said parts by weight of alkyl sulfate being based on 100 parts of polychloroprene, intimately mixing said latex with a coagulant solution, adding a base solution to said latex to reduce the acidity, recovering particulate polychloroprene and drying said particles, wherein the improvement comprises dissolving 0.5 to 5.0 parts of an additional emulsifier, which is stable in solutions having a pH of less than 4.5, per hundred parts of polychloroprene in said latex prior to or after said intimate mixing thereof with said coagulant solution and separating said coagulated latex and the spent coagulant solution prior to adding the base to the slurry of particulated rubber.

Normally, satisfactory powders cannot be made from polychloroprene latexes produced with resin or rosin-type soap systems. The coagulum prepared with these surfactants tends to agglomerate rather badly. The present invention describes an improved process for preparing powders from this type of latex.

Commercial polychloroprene recipes frequently employ resin-type soaps because the properties of the final polychloroprene produced are desirable. Conventional emulsifiers include, for example, the salts of rosins and rosin derivatives, such as wood rosin, or tall oil rosin and resins, disproportionated rosin or hydrogenated rosin. In addition, other conventional emulsifiers such as ammonium, sodium or potassium salts of long-chain fatty acids; alkali or alkaline earth salts of the condensate of formaldehyde and naphthalene sulfonic acid; nonionic surface active agents such as ethylene oxide or propylene oxide condensation products may be used. Additional emulsifiers are disclosed in U.S. Pat. No. 2,264,173. Preferred emulsifiers for the polymerization are the rosin derivative emulsifiers. In this specification, rosin or rosinates include the various commercial rosins, the hydrogenated rosins and disproportionated rosins and salts thereof. Rosin base emulsifiers are well known to the art. A particularly preferred rosin emulsifier is a disproportionated wood rosin, purified by distillation (sold by the Hercules Powder Company as Resin 731-S).

The pH of the aqueous emulsion for polymerization may be varied depending upon the particular emulsification system employed and can be acidic, neutral or alkaline; however, it is preferred to have a pH in the range of about 7 to 13.5. Generally, alkaline systems are used commercially.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha'-azo-bisisobutyronitrile and the like. Suitable inorganic peroxides are such as inorganic per acids including persulfates, perborates or percarbonates, e.g., ammonium or potassium persulfate and hydrogen peroxide. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The usual modifiers or other agents may be present in the emulsion. For instance, the polymerzation may be carried out in the presence of sulfur to produce a sulfur-modified polychloroprene. Also, chain-transfer agents may be employed such as the alkyl mercaptans, e.g., dodecyl mercaptan, iodoform, benzyl iodide and dialkyl xanthogen disulfides, e.g., diisopropyl xanthogen disulfide. Water soluble iron salts, e.g., ferrous sulfate or iron chelates may be suitably employed.

Normally, the polymerization would be conducted in an oxygen-free, or substantially oxygen-free atmosphere, such as use of an inert gas. However, in some processes a controlled amount of oxygen is employed.

The degree of polymerization and characteristic of the polymer can be controlled as is known in the art. The production of either benzene soluble or benzene insoluble polymers is within the scope of this invention. Suitable ranges for the percent of monomer conversion are such as between 60 and 90 percent conversion. The temperature of polymerization may be varied depending upon the particular type of polymer being employed with suitable ranges being from 0° to 90° C with the preferred range being between 15° C and 55° C.

The polymerization may be shortstopped by the addition of agents such as para-tertiary-butyl catechol and thiodiphenylamine. The process of polymerization may be either continuous or may be conducted in batch.

Polychloroprene preparative techniques are also disclosed in U.S. Pat. Nos. 1,950,436; 2,227,517; 2,321,693; 2,371,719; 2,463,009; 2,831,842; 2,914,497; 3,042,652; 3,147,318; 3,147,317; 3,655,827; British Pat. Nos. 1,237,750 and 1,158,970. Process and methods for the polymerization of chloroprene are disclosed, for example, in *Encyclopedia of Polymer Science and Technolgoy*, Vol. 3, p. 705-730 Interscience, 1965.

Comonomers may be employed with the selection of quantities of comonomer being chosen to produce a polymer. In this application, the term "polymers of chloroprene" encompasses polymers in which chloroprene is the major monomer. Examples of comonomers are 2,3-dichloro-1,3-butadiene; acrylonitrile, methyl methacrylate, and other esters, amides, nitriles, vinyl aromatic compounds such as styrene, aliphatic conjugated diolefins such as isoprene and vinyl ethers such as methyl vinyl ether. Usually, the total amount of comonomers will represent no greater than 25 mol percent of the total monomers and preferably will constitute less than 15 mol percent of the total monomers including chloroprene.

In my earlier application, it was disclosed that the addition of a small amount, i.e., 1 to 10 parts by weight of a soluble alkyl sulfate salt based on the polychloroprene preferably about 2 to 5 percent, to a latex prepared with a resin-type soap, produces upon coagulation with stirring, discrete particles of polychloroprene, which do not tend to agglomerate. In one aspect of the present invention, i.e., the addition of the emulsifier prior to the intimate mixing of the latex with the coagulant solution allows a reduction of the amount of soluble alkyl sulfate salt up to about 69%, (i.e., 1 to 3.1 parts by weight) preferably up to about 65%, (i.e., 1 to 3.5 parts by weight) in any given system without any tendency to agglomerate. Although the alkyl sulfate salt does improve the particulate process, it does tend to cause foaming, and the reduction afforded by the emulsifier as defined herein, reduces the foaming.

Preferably, the latex is acidified before or after the alkyl sulfate salt is added, i.e., prior to addition to the coagulant solution, which enhances the coagulation. A suitable pH would be in the range of 5.5 to 6.3, preferably about 5.8. Usually a weak acid such as acetic acid is used.

Alkyl sulfate salts have generally 6 to 20 carbon atoms and include, for example, octyl sulfate salts and lauryl salts. Suitable salts are ammonium and the alkali salts, particularly sodium and potassium. Alkyl radicals of 6 to 20 carbon atoms are well known and to the extent necessary, the *Handbook of Chemistry and Physics,* 51st edition, the *Chemical Rubber,* Cleveland 1962, pages C-55 to C-541, showing alkane, from which these radicals are derived, is incorporated.

The mixture is then added with vigorous stirring to a coagulant solution, which is acidic, i.e., less than about pH 4, and contains a coagulation promoting salt, such as aluminum sulfate. Other electrolytes such as sodium chloride, with or without alcohol, may be used. After the addition of latex to the coagulant, the pH of this mixture is preferably made less acidic, more preferably in the range of below 7.0, preferably around pH 6.0, i.e., 5.8 – 6.2. If an alcohol or ketone recovery is to be used, the pH of 7.0 to 7.5 is preferable; however, when an aqueous recovery system is employed, the 6.0 pH is preferred. An aqueous system is generally preferable because it is less hazardous and less expensive to operate. The adjustment may be made with ordinary bases such as NaOH, KOH, at preferably around 1 to 5 percent concentrations. However, it has been found that the alkali metal retard the cure of the polychloroprene and ammonium hydroxide may be used to avoid this. However, the present invention allows removal of a large amount of the acidic components, hence reducing the amount of base required, and making the use of NaOH and KOH practical. The stable emulsifiers of the present invention may be added to latex slurry before or after the coagulation, but before the adjustment pH of the solution up to about 6, i.e., 5.8 – 6.2.

The additional emulsifiers which are added to the system, according to the present invention, i.e., before or after the coagulation, are those which are stable under the strongly acid conditions of the coagulation, i.e., pH of less than 4.5. The rosin salts or soaps or the rosin derivative (disproportionated, hydrogenated or dehydrogenated rosin) salts or soaps are not stable at pH of 4.5 or below. Suitable emulsifiers which are stable in solutions of pH below 4.5 include: (1) ammonium, sodium or potassium salts of long-chain fatty acids; (2) alkali or alkaline earth salts of the condensation product of formaldehyde and naphthalene sulfonic acid; (3) ethylene oxide condensation products; or (4) propylene oxide condensation products. Those of group (2) have been found to provide excellent results and are preferred. In addition to being stable under very acid conditions, e.g., pH less than 4.5, these emulsifiers are generally stable under neutral and basic solution conditions, i.e., up to a pH of about 10.

The polychloroprene particles are separated from the liquid, e.g., by filtration, centrifuging, settling and decantation or the like, and the particles recovered and dried, for example, in a fluidized bed or a vibrator.

A parting agent is preferably employed with polychloroprene particles, such as silicone fluids, e.g., as Dow-Corning Silicone 1107, fumed $SiO_2$ or clay may be employed. Silicone fluids are highly effective in preventing particle adhesion at low concentrations, e.g., 0.25 – 1.0 may be added to polychloroprene particles in a wash solution for example, or may be dusted onto the dry particles. It may be desirable to add a small quantity, e.g., 0.5 to 1.0 phr, of fumed silica to the final product to further improve the flow characteristics of the powder. Generally, the parting agent will account for no more than 2.0 percent by weight, e.g., about 0.001 to 1.5 weight percent of the powder composition.

The finely dispersed polychloroprene product may be recovered from, i.e., isolated from aqueous systems, such as suspensions, slurries paste or cokes, or from a medium such as alcohol or ketone.

The alcohols and ketones employed will generally be the lower boiling member of the class, for example, having boiling points up to about 110° C and generally not lower than about 50° C. Suitable slurry medium include methanol, ethanol, isopropanol, propanol, butanol, acetone, methyl ethyl ketone, methyl vinyl ketone, diethyl ketone, diisopropyl ketone, methyl butyl ketone, and the like or mixtures thereof.

Normally, lower alcohols and ketones of 1 to 4 carbon atoms would be used for this purpose. About 5 to 200 weight percent of alcohol or ketone based on the polychloroprene may be used of, e.g., about 45 to 55 weight percent of the total mixture of alcohol, ketone and polymer.

Standard drying techniques such as fluidized beds and freeze drying may also be used. The alcohol/ketone treatment serves to dehydrate the particles, making them harder, more discrete and as a result, much less prone to stick together.

EXAMPLES

The latex used in the following examples was made according to the recipe below:

| Polychloroprene Recipe | |
|---|---|
| POLYMERIZATION CHARGE | |
| Monomer Solution | Parts by Weight |
| Chloroprene | 100.000 |
| Resin 731-SA[1] | 3.047 |
| Dodecyl Mercaptan | Variable |
| BHT | 0.100 |
| Water Solution | |
| Water | 110.000 |
| Sodium Hydroxide (100%) | 0.550 |
| Sodium Salt of Sulfated Oleic Acid (100%) Nopco 1338C | 0.375 |
| Lomar-PW (100%)[2] | 0.188 |
| Sodium Sulfite | 0.300 |
| CATALYST* | |
| Water | 99,600 |
| Silver Salt[3] | 0.070 |
| Potassium Persulfate | 0.350 |

[1]Disproportionated wood rosin obtained from Hercules, Inc., with specifications of minimum of 60° for specific rotation, acid number of 137 to 145, minimum of 48% dehydroabietic acid, maximum of 1.9 ultra violet absorptivity at 245 millimicrons. The 731-SA is soda ash treated 731-S disproportionated wood rosin. About 1.8 parts is equivalent to 1.76 parts of free acid rosin.
[2]Sodium salt of condensate of formaldehyde and naphthalene sulfonic acid.
[3]Common name for sodium anthraquinone-β-sulfonate.
*The parts by weight represent a % of the catalyst mixture. The amount of catalyst used is that required to maintain the reaction rate.

The polymerization is carried out under a nitrogen blanket at a temperature of 40° C. At 69 percent conversion, the reaction is shortstopped (approximately 3 hours) with an emulsion containing 0.02 parts t-butyl catechol, 0.02 parts phenothiazine, 0.8 parts chloroprene, 0.02 parts sodium dodecyl benzene sulfonate, and 0.8 parts deionized water, 0.010 parts Na salt of sulfated oleic acid, 0.0005 parts of an anti-foam agent, and 0.020 parts of octamine.

If these runs, the latex produced according to the above recipe was coagulated. The coagulant solution is shown below. The pH of the latex was adjusted with 10% acetic acid to 5.8 for each run.

| Ingredients | phr*** | |
|---|---|---|
| Latex Solution*: | | |
| Rubber(M-type) | 100 (260 gr latex) | |
| Sodium lauryl sulfate | As indicated (Add as 30% solution) | |
| Coagulant Solution: | | |
| Water | 500 | |
| Aluminum sulfate | 6.0 | (as 30% solution) |
| Conc. hydrochloric acid | 7.0 | |
| Polyamine-H** | 1.0 | |
| pH | 1.4 | |

*Adjust pH to 5.8 with 10% acetic acid
**Union Carbide
***Parts per hundred rubber The latex solution was added to the coagulant solution with moderate agitation.

EXAMPLES 1 – 4

These examples compare various methods of reducing the acidity of the latex after coagulation. Examples 1 and 2 are two direct, obvious approaches and Examples 3 and 4 are according to the present invention. The processes, conditions and results are set out in Table I.

TABLE I

REDUCTION OF ACIDITY OF COAGULATED LATEX

| | EMULSIFIER | | | SODIUM LAURYL SULFATE | | Description of | |
|---|---|---|---|---|---|---|---|
| Example | Yes/No | Amount | When | Yes/No | Amount | Process | RESULTS |
| 1 | No | — | — | Yes | 5.0 phr | Coagulant solution decanted, NH$_4$OH (2%) added | Rapid agglomeration |
| 2 | No | — | — | Yes | 5.0 phr | Coagulant solution decanted, washed | Rapid agglomeration |

TABLE I-continued
REDUCTION OF ACIDITY OF COAGULATED LATEX

| Example | EMULSIFIER Yes/No | Amount | When | SODIUM LAURYL SULFATE Yes/No | Amount | Description of Process | RESULTS |
|---|---|---|---|---|---|---|---|
| 3 | Yes* | 1.5 | After coagulation | Yes | 5.0 phr | with demineralized water, 2% NH$_4$OH added Coagulant solution decanted after emulsifier added, water wash - pH 6.0 with 2% NH$_4$OH | No agglomeration |
| 4 | Yes* | 1.5 | Before coagulation | Yes | 4.0 phr | Coagulant solution decanted after coagulation, water wash - pH 6.0 with 2% NaOH | No agglomeration |

*Lomar PW - Sodium salt of condensate of formaldehyde and naphthalene sulfonic acid.

EXAMPLES 4 – 8

These examples demonstrate the degree of alkyl sulfate salt reduction allowable with the addition of emulsifiers according to the present invention. In each of the examples, the same procedure was employed. The materials were added prior to coagulation. After coagulation, the coagulating solution was decanted, the latex washed once with demineralized water and the pH adjusted to about 6.0 with NaOH.

TABLE II

| Example | Dispersant phr* | Sodium Lauryl Sulfate, phr (% reduction) | Remarks |
|---|---|---|---|
| 5 | 0 | 5.0 — | Rapid agglomeration after addition of 2% NH$_4$OH |
| 4 | 1.5 | 4.0 (20%) | No agglomeration |
| 6 | 1.5 | 3.0 (40%) | No agglomeration |
| 7 | 1.5 | 2.0 (60%) | No agglomeration |
| 8 | 1.5 | 1.5 (70%) | Rapid agglomeration |

*Lomar PW

PHYSICAL PROPERTIES OF POWDERS PRODUCED

Each of the particulate polychloroprene runs of the Examples 4, 6 and 7 were recovered as dry particles by decanting pH adjusted solution from the latex and filtering, adding 2.0 phr fumed SiO$_2$, using 1 liter of water (decanted fluid may be used), stirred for 1 hour, allowed to stand for about 12 hours and refiltered and dried in Aeromatic Fluid Bed Drier at 50° C and 130 cubic meter per hour of air flow. This powder was compounded in a gumstock compound consisting of 100 parts rubber, 1.0 parts per hundered or rubber (phr) of Agerite Staylite-S antioxidant, 4.0 phr Maglite D, 5.0 phr zinc oxide and 0.35 phr NA-22 accelerator. The results of the testing are set out below in Table III.

Some physical properties of the present powders are compared to the powders produced according to parent application, Serial No. 571,957. Example 18 (control), which is prepared by the original process and contained no emulsifier according to the present invention (the spent coagulant was not removed prior to pH adjustment). In each of these examples the pH was adjusted with 2% NaOH.

TABLE III

| Sample No. | Ex. 4 | Ex. 6 | Ex. 7 | Control |
|---|---|---|---|---|
| Mooney Viscosity, ML2½/4 | 56/51 | 61/55.5 | 62/57 | 76.5/71.5 |
| Mooney Scorch 5 pt rise (min) | 20.0 | 18.5 | 18.0 | 13.3 |
| Tensile, psi | 2105 | 2000 | 2165 | 2275 |
| Shore A Hardness | 36 | 38 | 36 | 35.5 |
| Modulus at 300% | 150 | 150 | 165 | 200 |
| Modulus at 600% | 450 | 430 | 505 | 700 |
| Elongation, % | 945 | 955 | 920 | 980 |
| Monsanto Rheometer | | | | |
| Minimum Torque in/lbs | 6.5 | 7.0 | 7.5 | 13.8 |
| Scorch, 2 in/lb rise (minutes) | 5.75 | 6.0 | 6.0 | 6.7 |
| Torque at 30 minutes | 20.5 | 21.0 | 21.5 | 28.8 |
| Optimum Cure Torque | 20.5 | 19.5 | 20.0 | 27.3 |
| Optimum Cure Time | 29.5 | 25.0 | 25.0 | 26.0 |

The invention claimed is:

1. In a process for producing particulate polychloroprene comprising preparing a polychloroprene latex using a resin or rosin soap emulsification system, acidifying said latex to a pH in the range of 5.5 to 6.3, dissolving in said latex, 1 to 10 parts by weight of an alkyl sulfate salt having 6 to 20 carbon atoms per 100 parts of polychloroprene, intimately mixing said latex with a coagulant solution to produce a resultant solution having a pH of less than about 4.5, adding a base solution to said latex to reduce the acidity, recovering particulate polychloroprene and drying said particles, wherein the improvement comprises dissolving 0.5 to 5.0 parts of additional emulsifier, which is stable in solutions having a pH of less than 4.5, per hundred parts of polychloroprene in said latex prior to or after said intimate mixing thereof with said coagulant, and separating said coagulated latex and the spent coagulant solution prior to adding the base to said coagulated latex.

2. The process according to claim 1 wherein from 1.0 to 3.0 parts per hundred of chloroprene by weight of additional emulsifier are added.

3. The process according to claim 1 wherein said additional emulsifier is selected from the group consisting of (1) ammonium, sodium or potassium salts of long-chain fatty acids; (2) alkali or alkaline earth salts of the condensation product of formaldehyde and naphthalene sulfonic acid; (3) ethylene oxide condensation products; and (4) propylene oxide condensation of products.

4. The process according to claim 1 wherein said additional emulsifier is an alkali or alkaline earth salt of the condensation product of formaldehyde and naphthalene sulfonic acid.

5. The process according to claim 4 wherein said additional emulsifier is added to the latex prior to mixing with said coagulant solution.

6. The process according to claim 1 wherein the amount of alkyl sulfate salt is in the range of 1 to 3.5 parts by weight.

7. The process according to claim 4 wherein said additional emulsifier is added to the latex after mixing with said coagulant solution.

8. The process according to claim 4 wherein the coagulated latex, separated from the spent coagulant solution is washed with water prior to adding said base solution.

9. The process according to claim 8 wherein 1.0 to 3.0 parts by weight of additional emulsifier per 100 parts of polychloroprene are used.

10. The process according to claim 6 wherein the amount of alkyl sulfate is in the range of 1 to 3.1 parts by weight.

11. The process according to claim 1 wherein said additional emulsifier is selected from the group consisting of ammonium, sodium and potassium salts of long-chain fatty acids.

12. The process according to claim 1 wherein said additional emulsifier is an ethylene oxide condensation product.

13. The process according to claim 1 wherein said additional emulsifier is a propylene oxide condensation product.

* * * * *

UNITED STATES PATENT OFFICE
CERTIFICATE OF CORRECTION

PATENT NO. : 4,098,989  Page 1 of 2
DATED : July 4, 1978
INVENTOR(S) : Nathan L. Turner It is certified that error appears in the above-identified patent and that said Letters Patent are hereby corrected as shown below:

Column Abstract, line 7 reads "alkaline earth of" but should read -- alklaine earth salt of --

Figure 2:
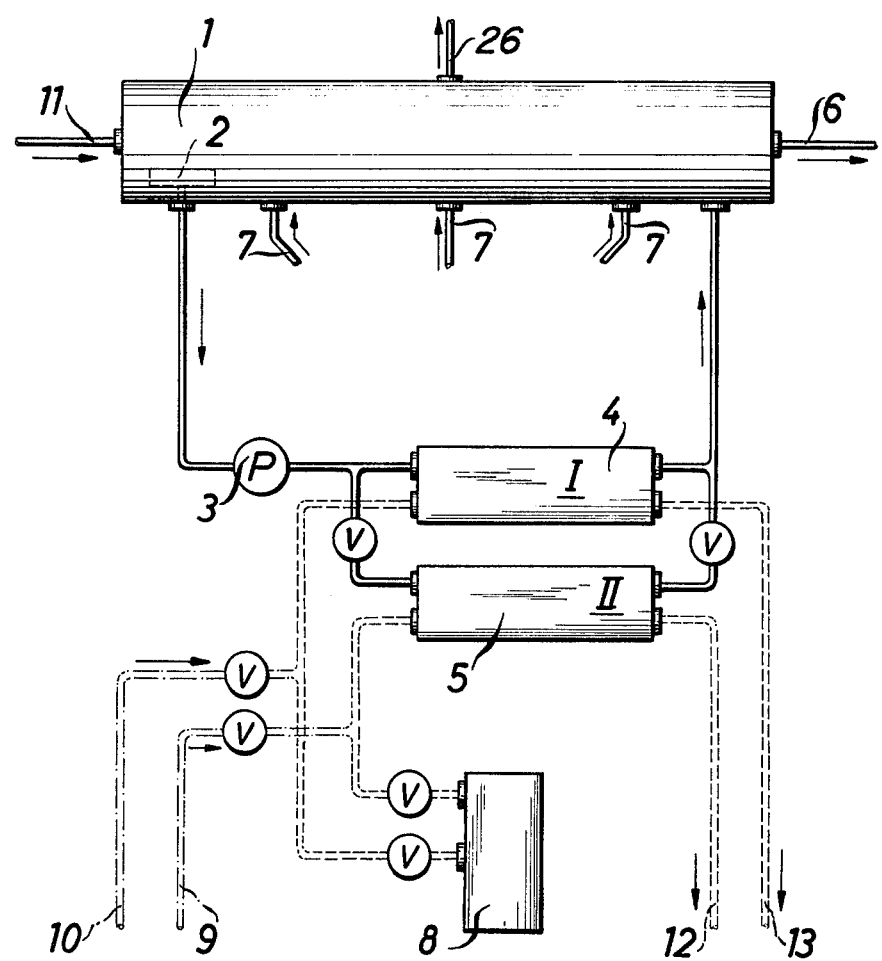

Drawings, Fig. 1 and Fig. 2 should read none

Column 1, line 47 reads "effect of" but should read -- effect on --

Column 1, line 67 reads "washing the pH" but should read -- washing and pH --

Column 4, line 32 reads "Chemical Rubber" but should read -- Chemical Rubber Company --

Column 4, line 49 reads "NaOH, KOH" but should read -- NaOH and KOH --

Column 5, line 30 reads "slurries" but should read -- slurries, --

Column 6, Table, Polychloroprene Receipe, 10th item, under "Parts by Weight" reads "99,600" but should read -- 99.600 --

UNITED STATES PATENT OFFICE
CERTIFICATE OF CORRECTION

PATENT NO. : 4,098,989
DATED : July 4, 1978
INVENTOR(S) : Nathan L. Turner

It is certified that error appears in the above—identified patent and that said Letters Patent are hereby corrected as shown below:

Column 6, line 32 reads "If these runs" but should read -- In these runs --

Signed and Sealed this

Twenty-sixth Day of February 1980

[SEAL]

Attest:

SIDNEY A. DIAMOND

Attesting Officer     Commissioner of Patents and Trademarks